United States Patent [19]

Tas

[11] Patent Number: 5,190,137

[45] Date of Patent: Mar. 2, 1993

[54] APPARATUS FOR ORIENTING SPHERICAL PRODUCTS HAVING AT LEAST ONE SUBSTANTIALLY FLATTENED SURFACE

[76] Inventor: Adrianus W. Tas, Burg. Winkellaan 3, 2631 HG Nootdorp, Netherlands

[21] Appl. No.: 690,784

[22] Filed: Apr. 26, 1991

[30] Foreign Application Priority Data

Apr. 26, 1990 [NL] Netherlands ............. 9001004

[51] Int. Cl.$^5$ ............................................. B65G 47/24
[52] U.S. Cl. ..................................... 198/387; 198/384; 198/779
[58] Field of Search ........................... 198/382–387, 198/779

[56] References Cited

U.S. PATENT DOCUMENTS

| | | | |
|---|---|---|---|
| 2,298,614 | 10/1942 | Carroll | 198/385 |
| 2,325,919 | 8/1943 | Porch | 198/779 X |
| 2,334,416 | 11/1943 | Kok | 198/384 X |
| 2,693,267 | 11/1954 | Metcalf | 198/385 |
| 2,843,251 | 7/1958 | Hoffman, Jr. et al. | 198/387 |
| 2,853,108 | 9/1958 | Hait | 198/387 X |
| 3,091,323 | 5/1963 | Niederer, Jr. et al. | 198/387 |
| 3,163,282 | 12/1964 | Shropshire et al. | 198/384 |
| 3,857,472 | 12/1974 | Klint | 198/384 |
| 4,005,774 | 2/1977 | Valero | 198/384 |
| 4,353,455 | 10/1982 | Mumma et al. | 198/384 |
| 4,382,501 | 5/1983 | Niederer et al. | 198/384 |

FOREIGN PATENT DOCUMENTS

| | | |
|---|---|---|
| 319239 | 6/1989 | European Pat. Off. . |
| 1519622 | 12/1966 | France . |
| 0067415 | 4/1982 | Japan ............. 198/383 |

Primary Examiner—Robert P. Olszewski
Assistant Examiner—James R. Bidwell
Attorney, Agent, or Firm—Griffin Butler Whisenhunt & Kurtossy

[57] ABSTRACT

This invention relates to an apparatus for orienting spherical products having at least one substantially flattened surface, such as tomatoes and the like. The apparatus comprises a roller conveyor whose rollers are rotatable about their axis, while the free space between successive rollers is smaller than the greatest diameter of the product to be oriented. The roller conveyor further comprises members projecting above the top surface of the rollers to form conveyor compartments for receiving therein one product to be oriented. According to the invention, the center-to-center distance between successive rollers of the conveyor (1) is at most equal to the diameter of the flattened surface of the product to be sorted.

14 Claims, 2 Drawing Sheets

APPARATUS FOR ORIENTING SPHERICAL PRODUCTS HAVING AT LEAST ONE SUBSTANTIALLY FLATTENED SURFACE

This invention relates to an apparatus for orienting spherical products having at least one substantially flattened surface, such as tomatoes and the like, said apparatus comprising a roller conveyor whose rollers are rotatable about their axis, while the free space between sucessive rollers is smaller than the greatest diameter of the product to be oriented, said roller conveyor further comprising members projecting above the top surface of the rollers to form conveyor compartments for receiving therein one product to be oriented.

In packaging products such as tomatoes, whether automatically or not, it is of importance that these products are placed in a package with their flattened portion in a specific desired position. Accordingly, before being placed in a package, the randomly supplied tomatoes must be oriented in that position which they are to take up in the package.

An apparatus of the above described type, at least suitable for orienting pedunded products is described in U.S. Pat. No. 4,005,774. Utilizing that apparatus, the randomly supplied products must be oriented in such a way that the pedicle of the products points in downward direction. During this operation the products to be oriented finally rest on two rollers of the roller conveyor. One of the rollers must have a profiled surface to permit the pedicle of the rotating product to pass, while the other supporting roller has the shape of a hyperboloid. The product sinks partly into the free space between the two supporting rollers. In oriented position, the direction of the pedicle is not defined, i.e. the pedicle can still take up a large number of positions, bounded by an enclosing cone.

It is an object of the invention to provide an apparatus which is suitable for orienting a different type of product, wherein, moreover, the oriented position is defined more accurately. To that effect, the apparatus according to the invention is characterized in that the centre-to-centre distance between successive rollers of the conveyor is at most equal to the diameter of the flattened surface of the product to be sorted.

When orienting products of the above described type, it is necessary to prevent the flattened surface thereof to assume an inclined position relative to the top surface of the rollers of the roller conveyor, for example as a result of the product sinking into the free space between two successive rollers of the roller conveyor. It is therefore of importance for the centre-to-centre distance between the rollers to be adapted to the dimensions of the flattened surface of the product to be oriented. Preferably, the supporting surface of the rollers cooperating with this flattened surface of the products has a substantially cylindrical shape and the number of supporting rollers for each product is greater than two. This last can be accomplished by making the centre-to-centre distance between successive rollers at most equal to half the diameter of the flattened surface of the product to be sorted.

The drive of the rollers of the roller conveyor is effected preferably by a guideway mounted below the upper part of the roller conveyor, which guideway imparts a rotating movement to the rollers when the conveyor is being driven. In order to render the rotational speed of these rollers independent of the travelling speed of the conveyor, this guideway is preferably constructed partly as an endless drive belt.

One embodiment of the apparatus according to the invention will now be further explained, by way of example, with reference to the accompanying drawings, in which.

Figure 1:
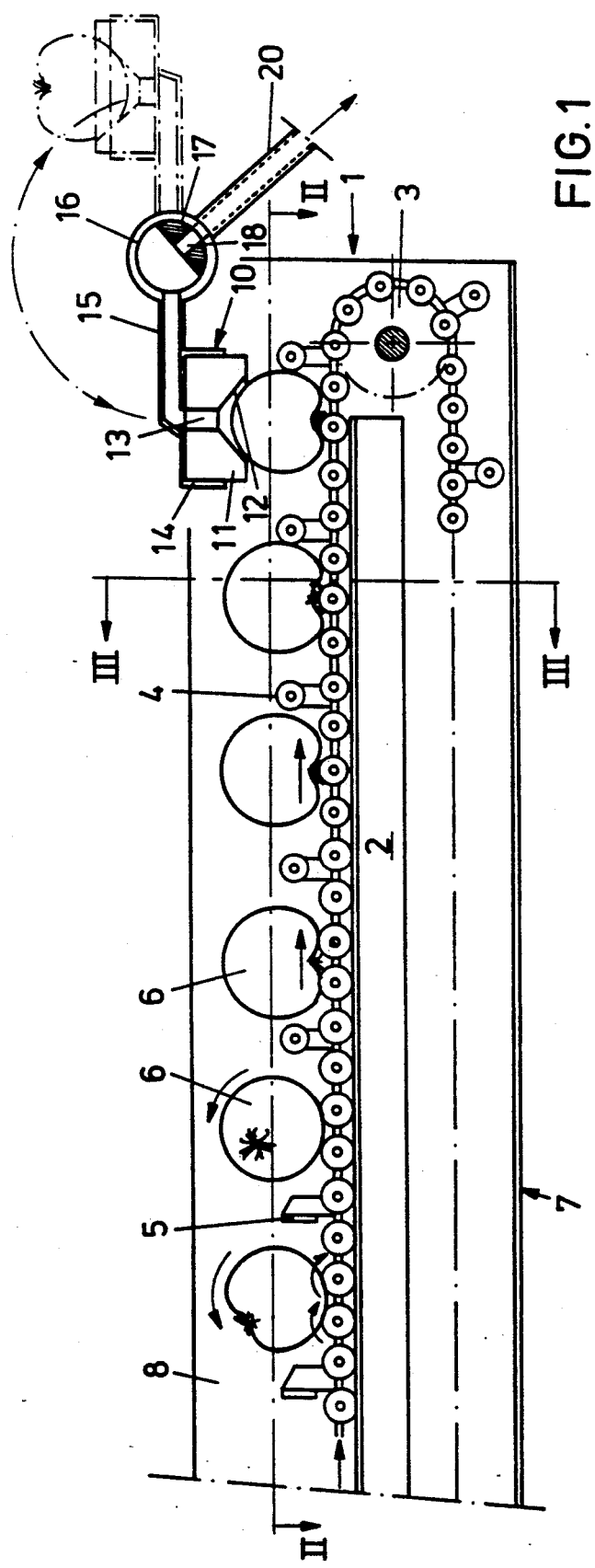
FIG. 1 is a diagrammatic side elevational view of a part of an apparatus for orienting tomatoes.

The apparatus for orienting tomatoes and the like comprises an endless roller conveyor 1, with smooth cylindrical rollers, which conveyor is supported by a guideway 2 (FIG. 1). At the turning points (of which only one is shown) the conveyor 1 is guided by chain wheels 3, one of which can be driven by a motor (not shown).

At regularly spaced intervals, the conveyor 1 is provided with retaining members 4, 5 so as to form compartments for receiving therein a product to be oriented. In the embodiment shown in FIG. 1, these retaining members in the right-hand part of the figure are constructed as rotatable or fixed rollers 4 and in the left-hand part as fixed strips 5. The function of the retaining members 4, 5 will be explained hereinafter.

By virtue of the fact that the rollers of the conveyor 1 rest on the guideway 2, these rollers will automatically start rotating in the direction indicated in FIG. 1 by arrows when the conveyor 1 is being driven. The products supported by the rollers—tomatoes 6 in the present case—will thereby be caused to rotate in the opposite direction (see the arrows in FIG. 1) and this rotating movement will continue until the flat bottom of each product 6 rests on at least two and preferably three successive rollers 4. (See the right-hand part of FIG. 4). In this position the motion of translation-rotation of the products 6 will become a motion of translation effected by the conveyor. Thus the products will continue to move until they abut against the retaining members 4, 5 and in that position rest, while slipping, on the rollers of the conveyor 1.

Figure 2:
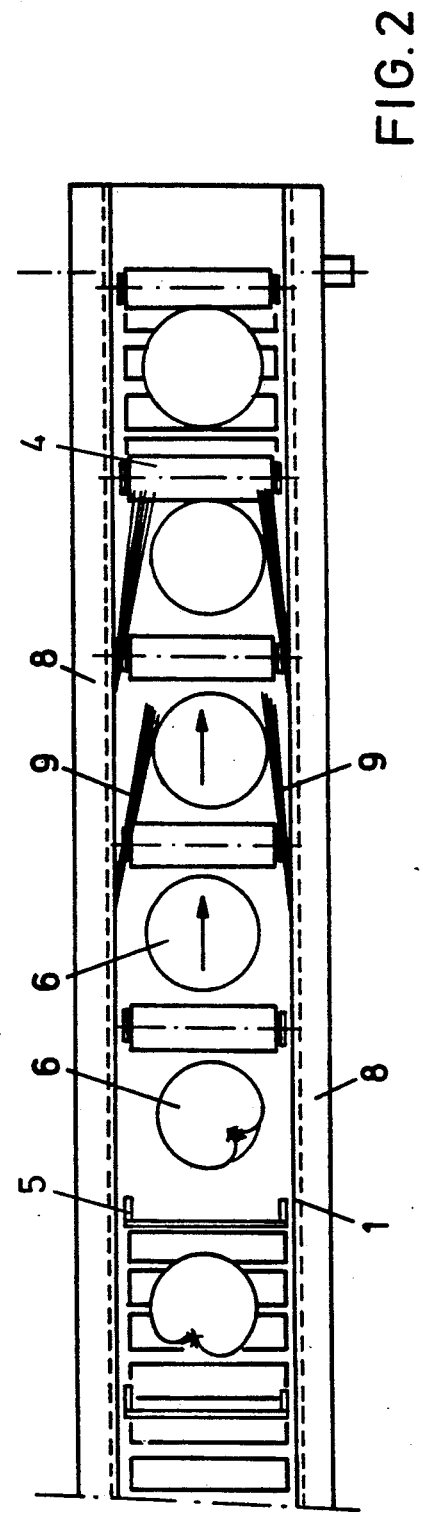
FIG. 2 is a top plan view taken on the line II—II of FIG. 1.
Figure 3:
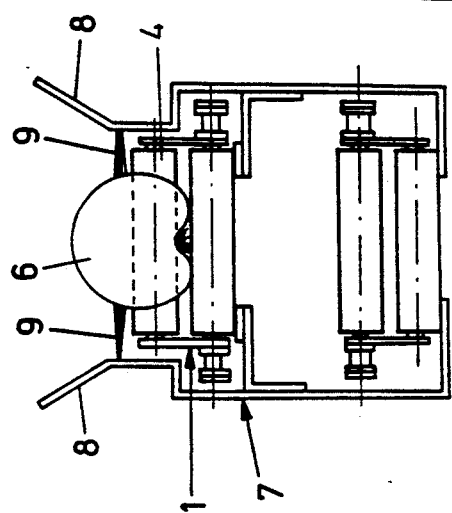
FIG. 3 is a section taken on the line III—III of FIG. 1.

In order that the products 6 can subsequently be readily gripped, the conveyor is provided with a housing 7 with tapered sidewalls 8 (FIG. 3). Further, means are provided for accurately centring the products 6 in the middle of the conveyor 1. FIG. 2 shows some of these means, comprising resilient orienting members 9 pointing towards each other in tapered configuration in the direction of travel (For the sake of clarity, the orienting members 9 have been omitted in FIG. 1).

Shown at the end of conveyor 1 is a suction member 10 for taking out the oriented tomatoes 6.

The suction member 10 comprises a suction cup 11 made of cellular material, the suction cup being provided with a conical recess 12 and a passage 13 connecting thereto. The suction member 10 is mounted in a closed holder 14. Connected to the passage 13 is a hollow arm 15, terminating in the interior of a tubular or spherical member 16. The tubular or spherical member 16 can be moved by means of a mechanism (not shown) from the position indicated by solid lines into the position indicated by the dot and dash lines.

Disposed in the spherical or tubular member 16 is a closing member or valve member 17 provided with a passage 18 communicating with a suction pipe 20 which is connected to a vacuum source (not shown).

The operation of the suction member 10 is as follows. In the position indicated by solid lines, the vacuum source is in open communication with the suction member 10, so that a fruit can be gripped. In the position indicated by dot and dash lines, the communication is interrupted, so that the product can be taken out readily in that position.

Figure 4:
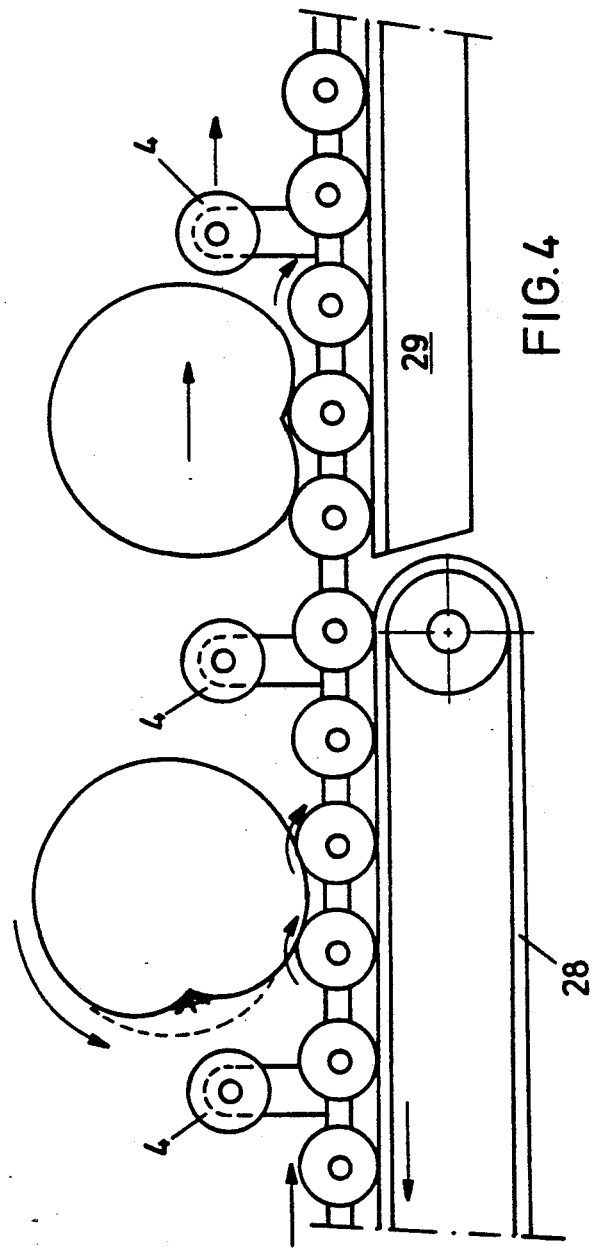
FIG. 4 is an elevation similar to that of FIG. 1, on an enlarged scale, of a variant of the apparatus according to the invention.

In the variant shown in FIG. 4, use is made of a conveyor 1 which is equipped with two different guiding members, namely a first guiding member comprising an endless, rotating conveyor belt or drive belt 28 and a second guiding member consisting of a fixed guideway 29. The direction of travel of conveyor 1 is indicated in FIG. 4 by arrows. By driving the conveyor belt 28 in opposite direction, the rollers of the conveyor 1 will gain a considerably greater rotational speed than in the case of a stationary guiding member 2 according to FIG. 1, with the result that the products 6 will be oriented in the desired position considerably faster, i.e. while traversing a shorter path. The conveyor belt 28 rotating in the opposite direction extends only along a portion of the length of the conveyor 1, while the rest of the conveyor 1 is supported by a stationary guide 29.

I claim:

1. In an apparatus for orienting substantially spherical products having at least one substantially flattened surface, such as tomatoes and the like, said apparatus comprising a roller conveyor having spaced apart rollers which are rotatable about their axis and a free space is provided between each of successive rollers which is smaller than a greatest diameter of the product to be oriented, said roller conveyor further comprising projecting members extending above a top surface of the rollers so as to form conveyor compartments between the projecting members for receiving therein one product to be oriented, the improvement wherein a product-supporting part of each roller has a substantially cylindrical shape and the center-to-center distance between each of successive rollers of the conveyor is at most equal to half the diameter of the flattened surface of the product to be oriented and the number of rollers in each compartment is greater than two.

2. An apparatus according to claim 1, wherein an upper part of the roller conveyor is supported by a guideway which imparts a rotating movement to the rollers when the conveyor is being driven.

3. An apparatus according to claim 2 wherein the product rotates in a direction opposite to the rotation of the rollers.

4. An apparatus according to claim 3, wherein a part of the guideway consists of an endless drive belt.

5. An apparatus according to claim 1, wherein the projecting members extending above the top surface of the roller conveyor consist of a roller that may or may not be freely rotatable.

6. An apparatus according to claim 1, wherein the projecting members extending above the top surface of the roller conveyor consist of fixed strips.

7. An apparatus according to claim 1, wherein on opposite sides of the conveyor, orienting members are mounted for guiding the product to be oriented to the center of the conveyor compartment.

8. An apparatus according to claim 7, wherein the orienting members comprise resiliently mounted strips or brushes pointing towards each other in tapered configuration in the direction of transport of the products to be oriented.

9. An apparatus according to claim 1, wherein a product unloading means is disposed near the conveyor for unloading oriented products from the conveyor, said unloading means being a suction device equipped with a flexible sponge-like member with a conical recess for receiving therein the oriented product, said sponge-like member having a passage therein connected to a vacuum source.

10. An apparatus according to claim 9, wherein the sponge-like member is mounted in a holder.

11. An apparatus according to claim 9, wherein said passage is connected via a hollow arm to a spherical or tubular member, which can be moved about a closing member provided with a passage by which the interior of the spherical or tubular member can be connected to a vacuum source.

12. An apparatus according to claim 1 wherein an endless rotating conveyor belt contacts and causes rotation of the rollers and the belt is driven in a direction opposite to the rotation of the rollers.

13. An apparatus according to claim 1 wherein the rollers are straight cylindrical rollers which are equally spaced apart.

14. An apparatus according to claim 1 wherein the oriented products abut a projecting member.

* * * * *